С011712803B2

(12) United States Patent
Okuyama

(10) Patent No.: US 11,712,803 B2
(45) Date of Patent: Aug. 1, 2023

(54) TEACHING METHOD

(71) Applicant: Seiko Epson Corporation, Toyko (JP)

(72) Inventor: Masayuki Okuyama, Suwa (JP)

(73) Assignee: SEIKO EPSON CORPORATION

( * ) Notice: Subject to any disclaimer, the term of this patent is extended or adjusted under 35 U.S.C. 154(b) by 141 days.

(21) Appl. No.: 17/213,285

(22) Filed: Mar. 26, 2021

(65) Prior Publication Data

US 2021/0299869 A1 Sep. 30, 2021

(30) Foreign Application Priority Data

Mar. 27, 2020 (JP) .................................. 2020-057350

(51) Int. Cl.
 *B25J 9/16* (2006.01)
(52) U.S. Cl.
 CPC ........... *B25J 9/1664* (2013.01); *B25J 9/1692* (2013.01)
(58) Field of Classification Search
 CPC ...... B25J 9/1664; B25J 9/1692; B25J 9/1656; B25J 9/1602; B25J 9/1633; G05B 2219/36492; G05B 2219/49113; G05B 19/42
 See application file for complete search history.

(56) References Cited

U.S. PATENT DOCUMENTS

| 6,124,693 A * | 9/2000 | Okanda | G05B 19/425 901/41 |
| 2014/0236565 A1* | 8/2014 | Kuwahara | B25J 9/1671 703/22 |
| 2015/0151431 A1* | 6/2015 | Suyama | B25J 9/1605 901/5 |
| 2021/0001483 A1* | 1/2021 | Milenkovic | B25J 9/046 |

FOREIGN PATENT DOCUMENTS

| JP | H07-100755 A | 4/1995 |
| JP | H08-016225 A | 1/1996 |
| JP | H08-085083 A | 4/1996 |

* cited by examiner

*Primary Examiner* — Abby Y Lin
*Assistant Examiner* — Dylan Brandon Mooney
(74) *Attorney, Agent, or Firm* — Harness, Dickey & Pierce, P.L.C.

(57) ABSTRACT

A teaching method of teaching a position of a control point on a working route through which the control point set on a robot arm passes when the robot arm performs work and a posture of the robot arm using three-dimensional data of a working object, includes a first step of setting a predetermined first work point on the working route based on the three-dimensional data, and a second step of associating a first coordinate system set for the first work point with a second coordinate system set for the robot arm when the control point is located at the first work point, wherein, at the second step, one is selected from a plurality of candidates of the first coordinate system at the first work point, and the selected coordinate system is set as a first correction coordinate system for the first work point.

6 Claims, 10 Drawing Sheets

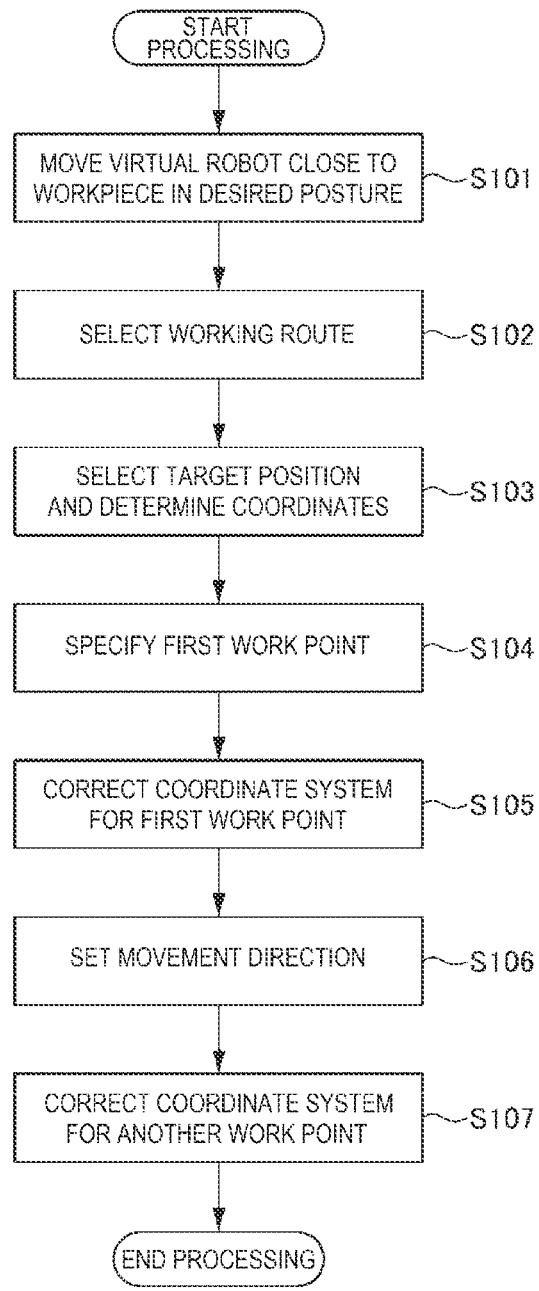

TEACHING METHOD

The present application is based on, and claims priority from JP Application Serial Number 2020-057350, filed Mar. 27, 2020, the disclosure of which is hereby incorporated by reference herein in its entirety.

BACKGROUND

1. Technical Field

The present disclosure relates to a teaching method.

2. Related Art

Robots having robot arms with end effectors attached to distal ends and performing predetermined work on workpieces by driving the robot arms are known. In the robot, for example, as shown in JP-A-8-85083, a tool passage point as a target position through which a distal end of the end effector passes is set on a surface of a workpiece. Then, the robot arm is driven so that the distal end of the end effector may pass the tool passage point.

Further, JP-A-8-85083 discloses a method of setting grid points in a mesh form on the surface of the workpiece in three-dimensional data of the workpiece and setting the respective grid points as the tool passage points. A sequence of movement is set for the respective tool passage points, and thereby, a working route of the robot arm is generated.

However, in the method disclosed in JP-A-8-85083, a posture of the robot is set based on a coordinate system set for the three-dimensional data, and the correspondence with a coordinate system set for the robot is not obtained. Accordingly, the set posture of the robot may be different from a desired posture.

SUMMARY

A teaching method according to an aspect of the present disclosure is a teaching method of teaching a position of a control point on a working route through which the control point set on a robot arm passes when the robot arm performs work and a posture of the robot arm using three-dimensional data of a working object. The method includes a first step of setting a predetermined first work point on the working route based on the three-dimensional data, and a second step of associating a first coordinate system set for the first work point with a second coordinate system set for the robot arm when the control point is located at the first work point, wherein, at the second step, one is selected from a plurality of candidates of the first coordinate system at the first work point, and the selected coordinate system is set as a first correction coordinate system for the first work point.

BRIEF DESCRIPTION OF THE DRAWINGS

FIG. 13 is a flowchart for explanation of an example of control operation of the robot system shown in FIG. 1.

DESCRIPTION OF EXEMPLARY EMBODIMENTS

First Embodiment

Figure 1:
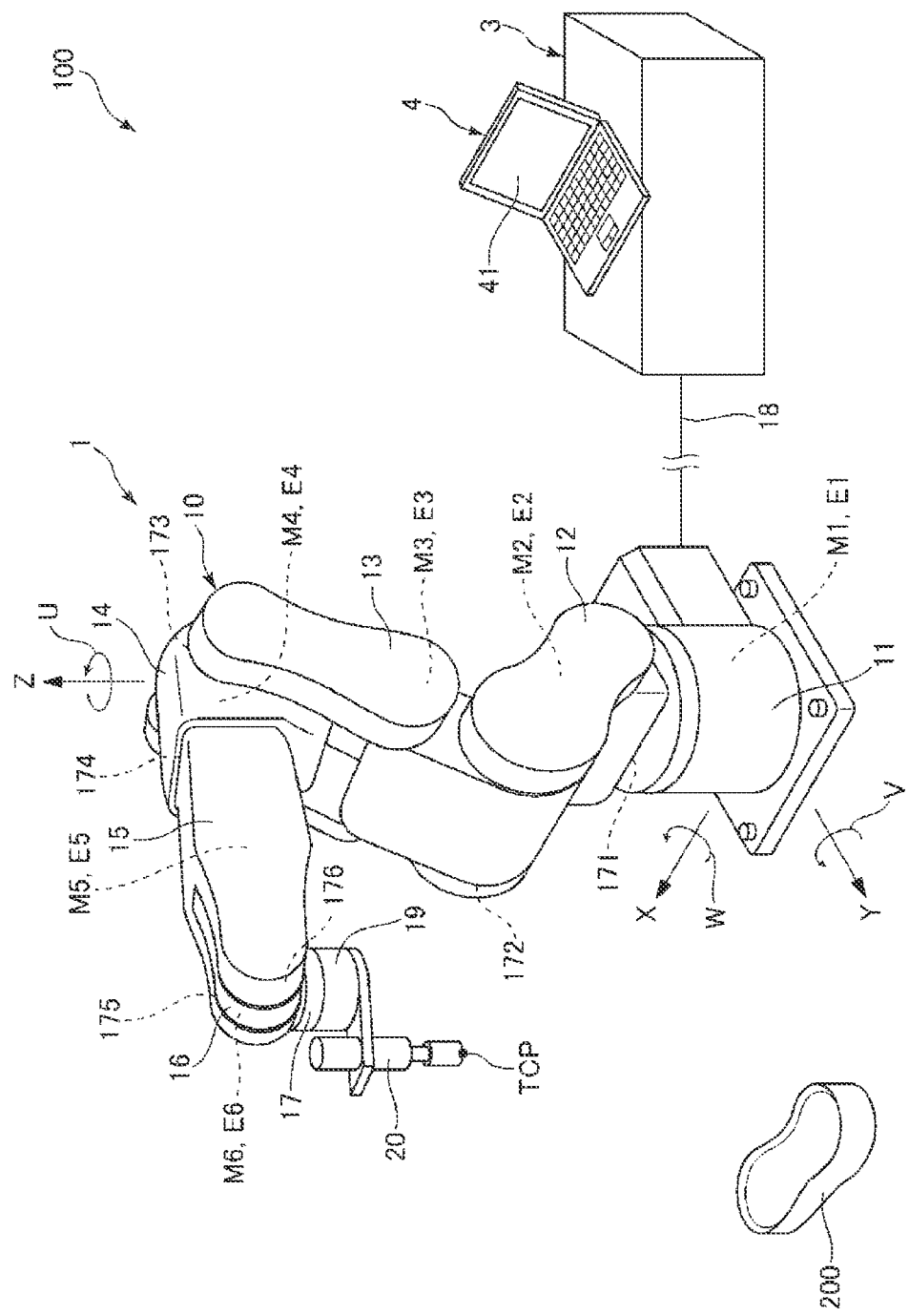
FIG. 1 shows an overall configuration of a robot system of a first embodiment.
Figure 2:
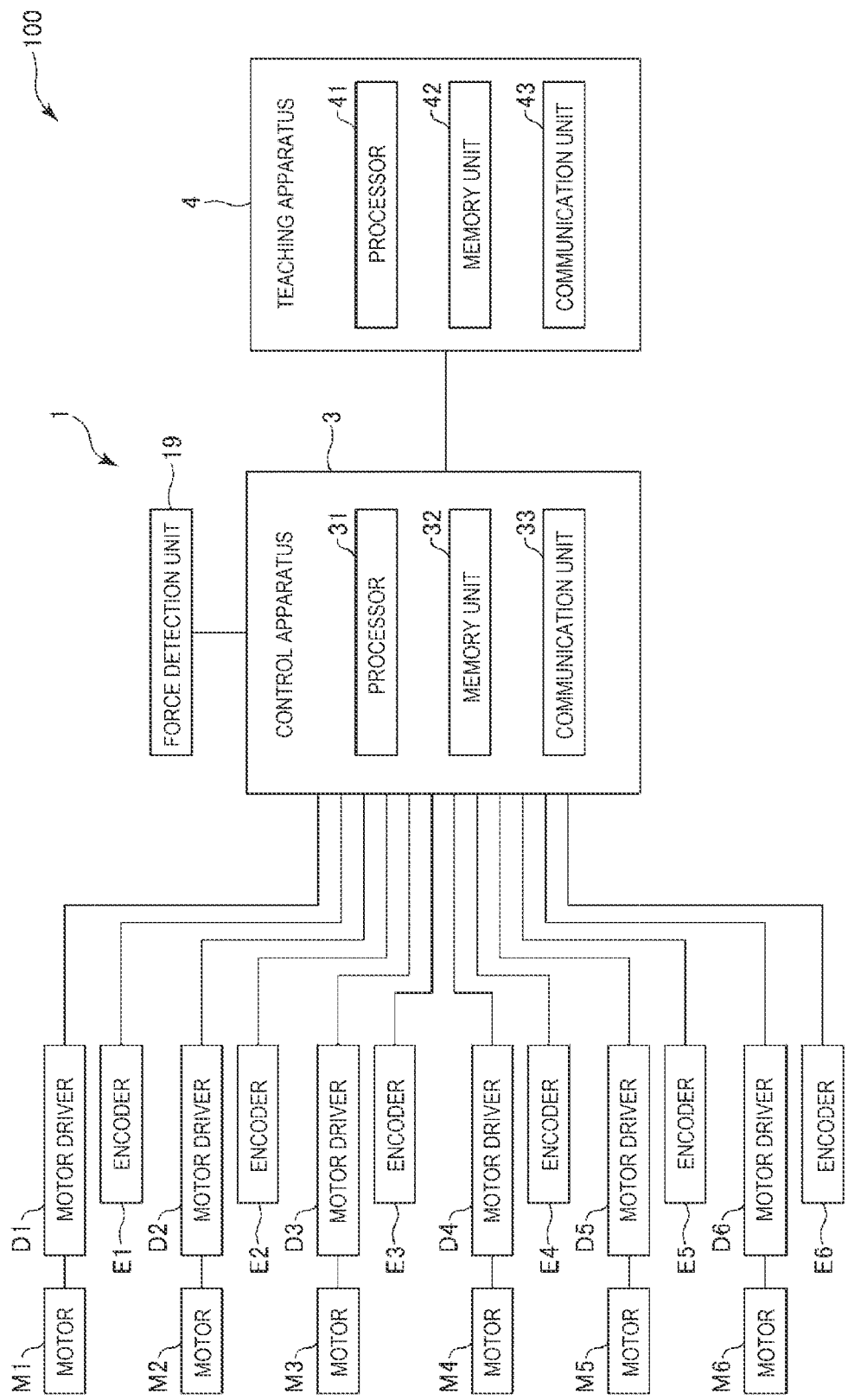
FIG. 2 is a block diagram of the robot system shown in FIG. 1.
Figure 3:
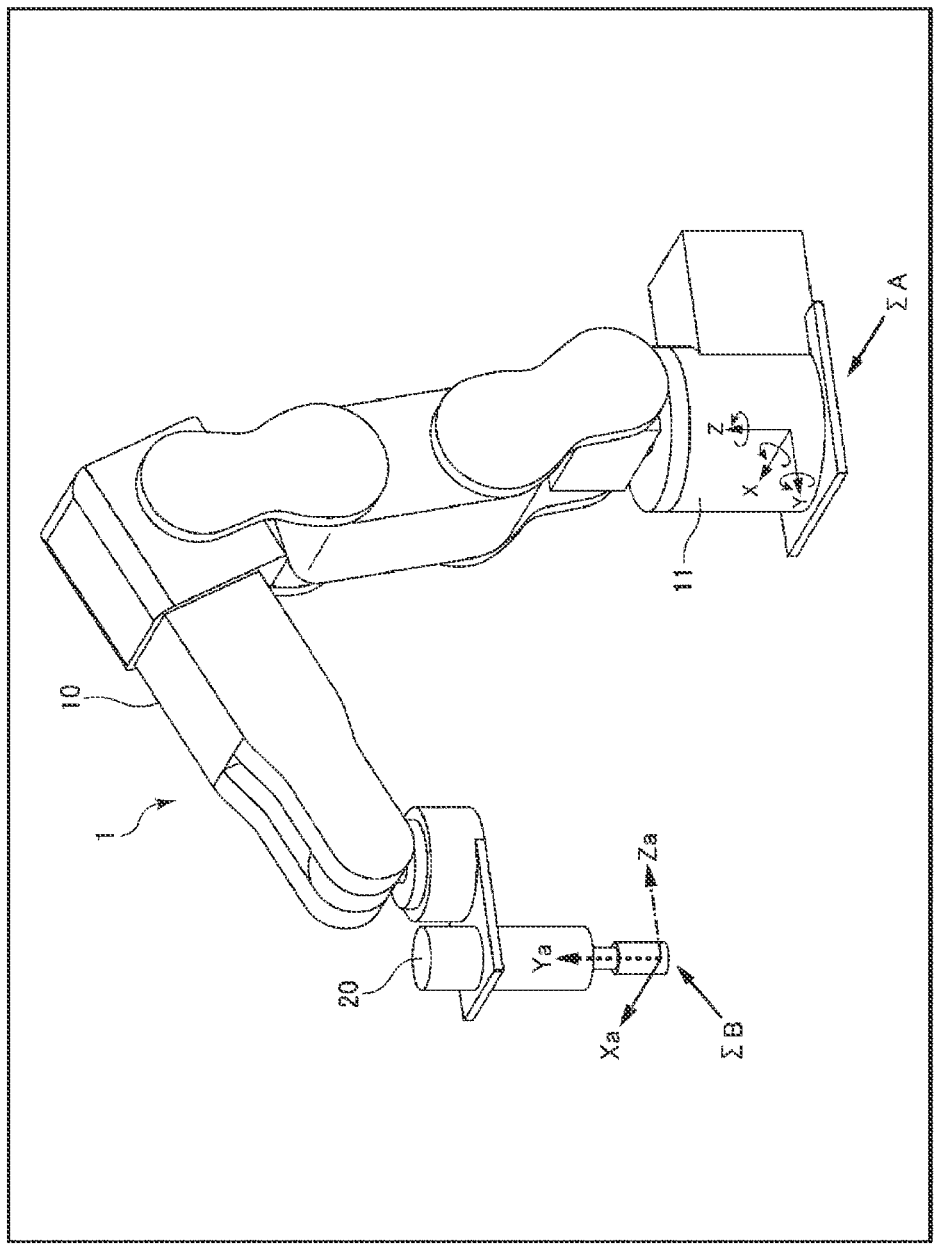
FIG. 3 is a conceptual diagram when a model of a robot is displayed using simulation software.
Figure 4:
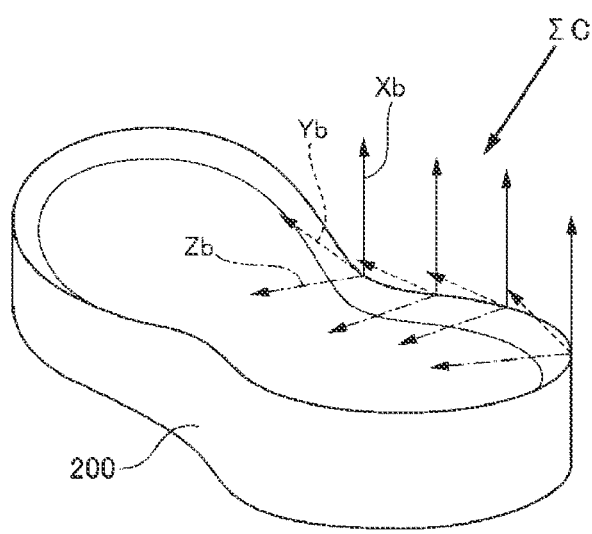
FIG. 4 is a conceptual diagram when a model of a working object is displayed using the simulation software.
Figure 5:
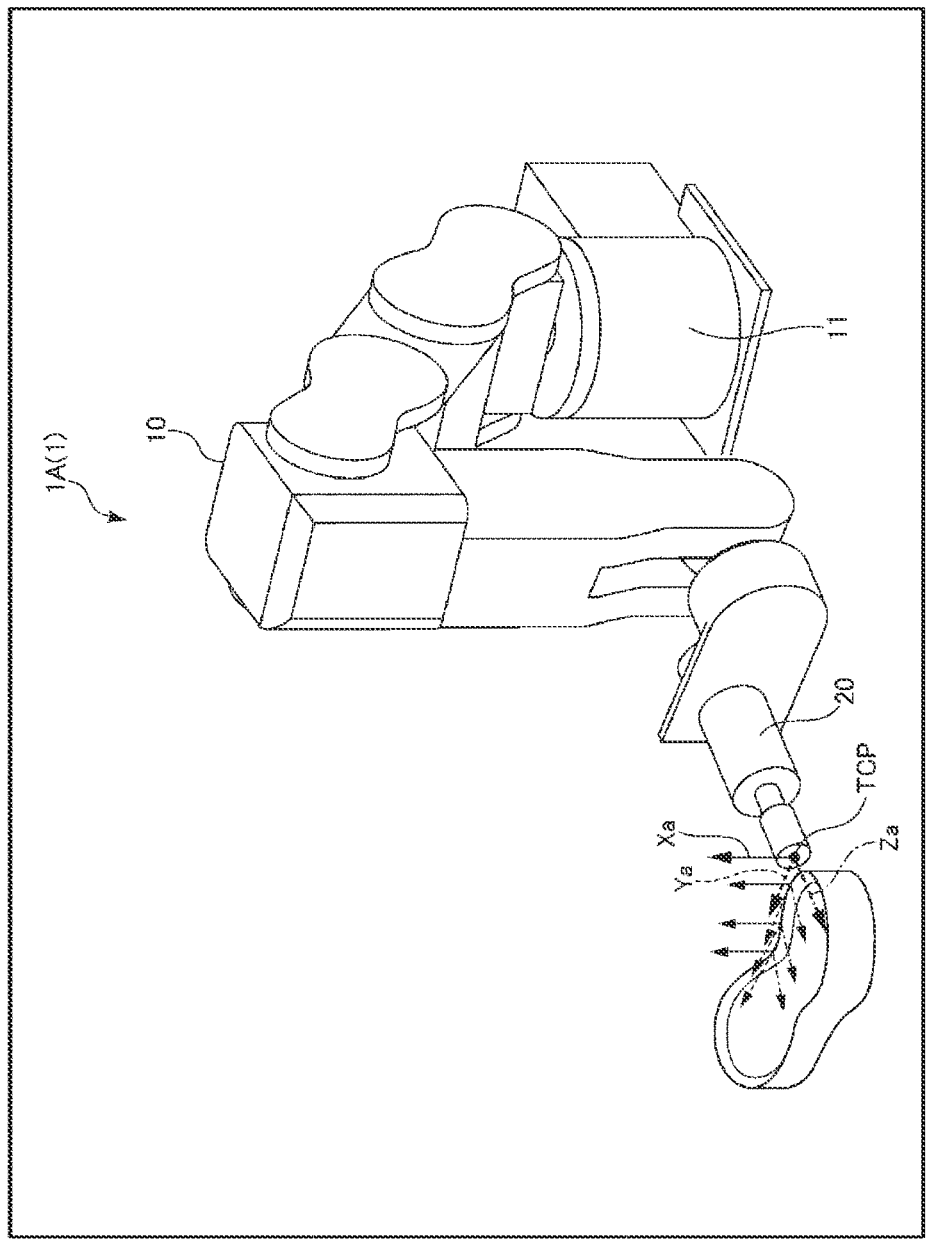
FIG. 5 is a conceptual diagram when the model of the working object and the model of the robot are collectively displayed using the simulation software, showing an undesirable posture of the robot.
Figure 6:
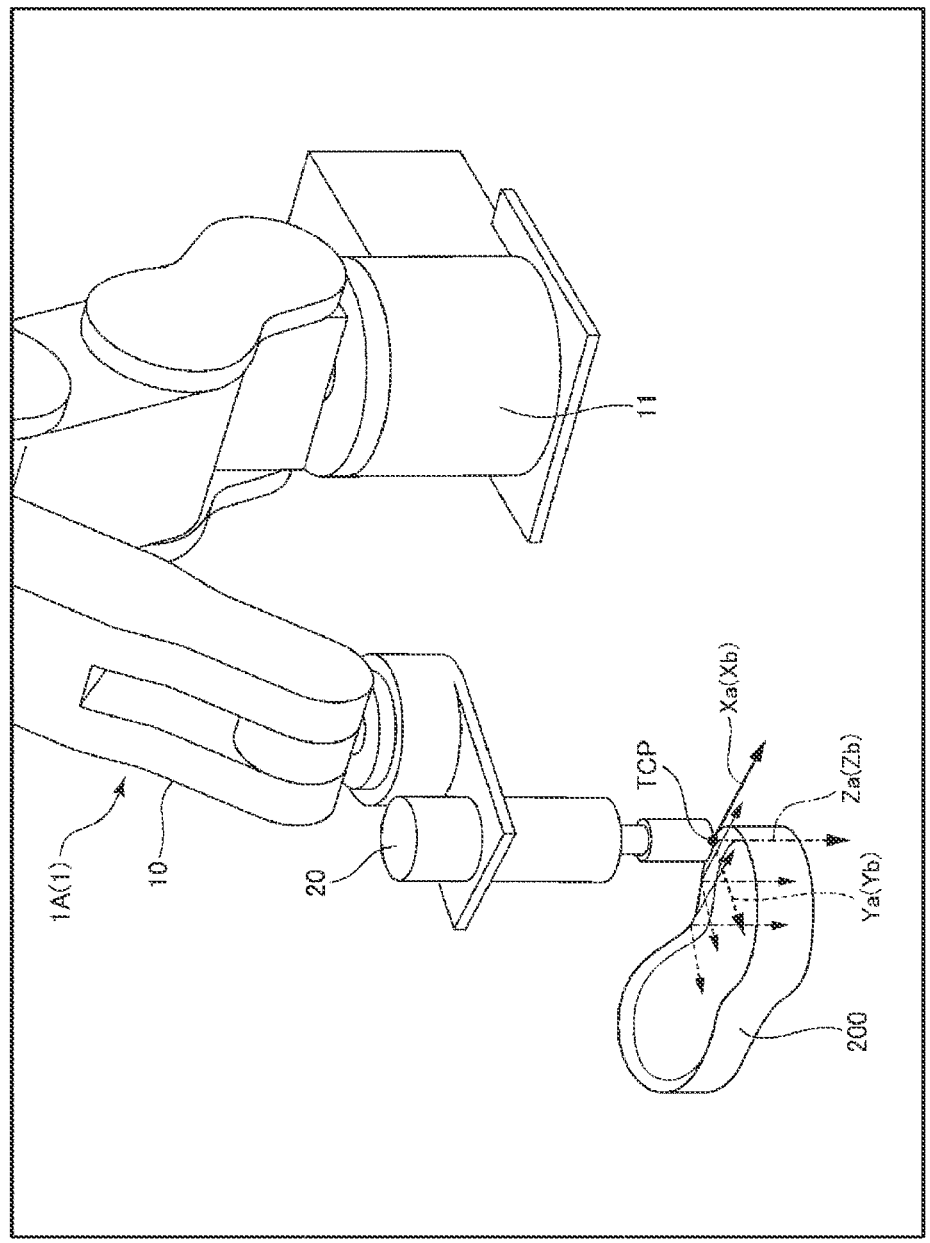
FIG. 6 is a conceptual diagram when the model of the working object and the model of the robot are collectively displayed using the simulation software, showing a desirable posture of the robot.
Figure 7:
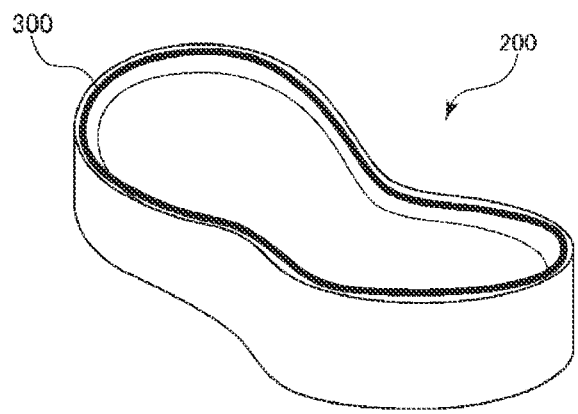
FIG. 7 is a conceptual diagram when the model of the working object is displayed using the simulation software, showing a state in which a working route is set.
Figure 8:
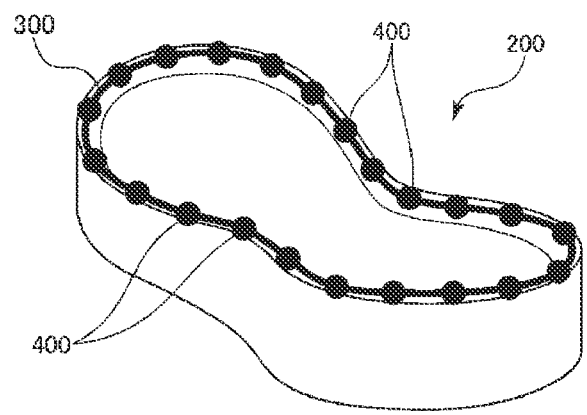
FIG. 8 is a conceptual diagram when the model of the working object is displayed using the simulation software, showing a state in which target positions are set.
Figure 9:
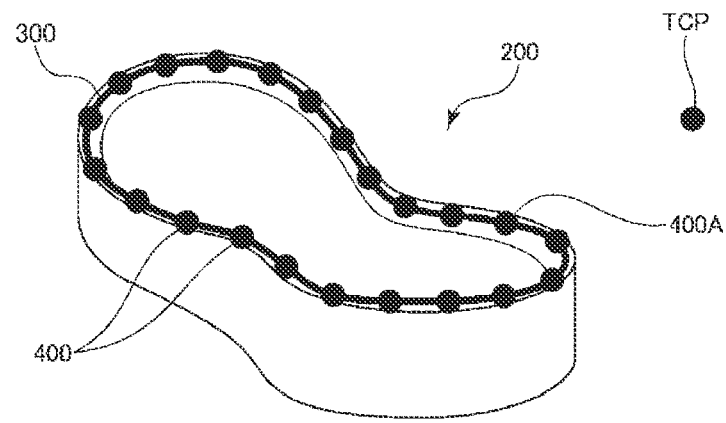
FIG. 9 is a conceptual diagram when the model of the working object is displayed using the simulation software, showing a state in which a first work point is set.
Figure 10:
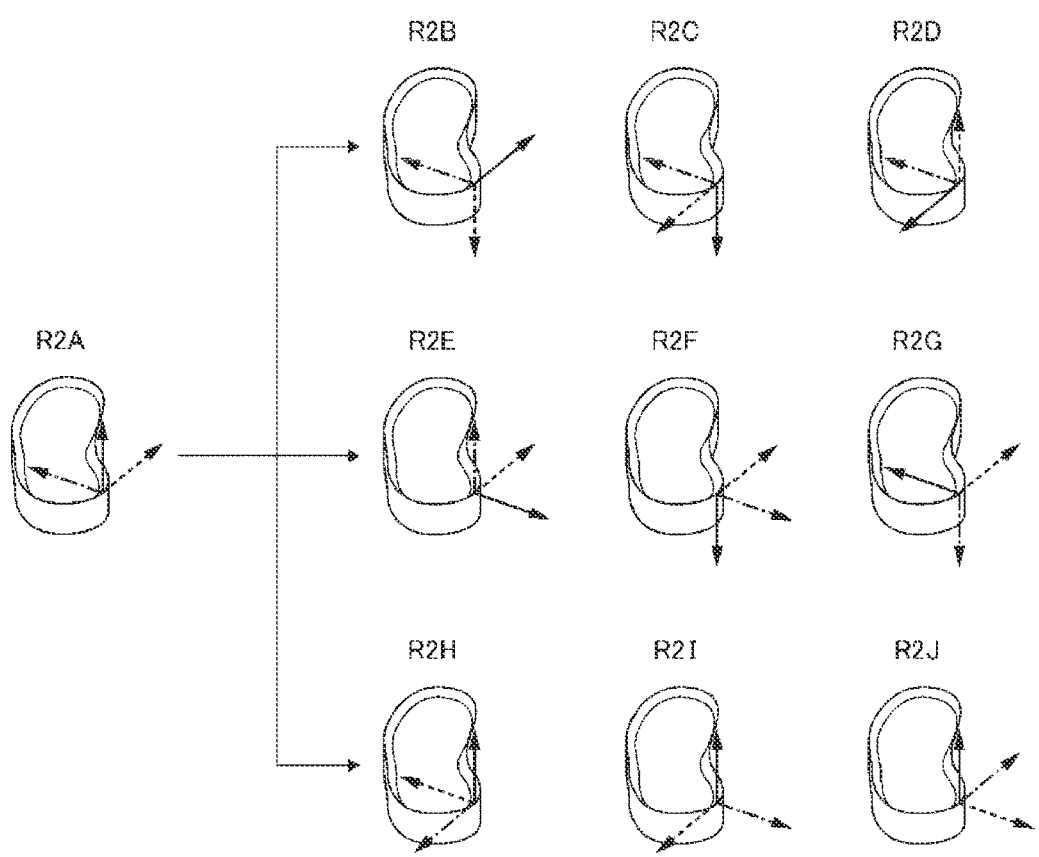
FIG. 10 is a conceptual diagram when the model of the working object is displayed using the simulation software, showing an example of candidates of a first coordinate system.
Figure 11:
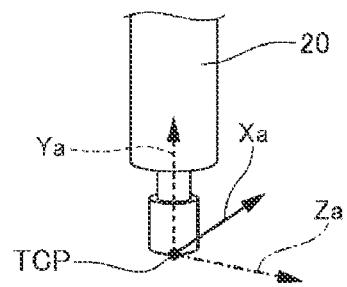
FIG. 11 is a conceptual diagram when the model of the working object and the model of the robot are collectively displayed using the simulation software, showing a state in which a first correction coordinate system is set for the first work point.
Figure 11:
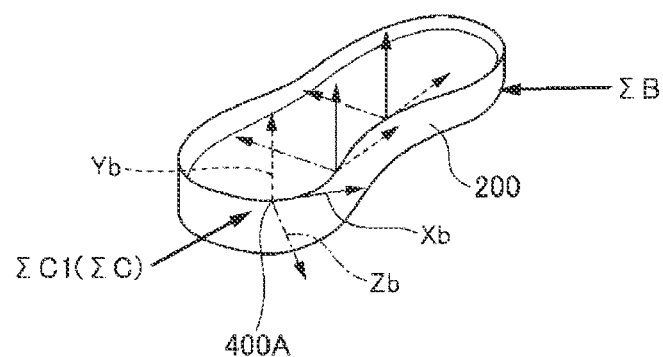
Figure 12:
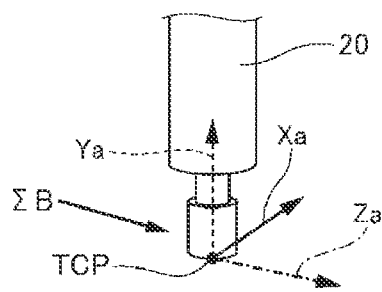
FIG. 12 is a conceptual diagram when the model of the working object and the model of the robot are collectively displayed using the simulation software, showing a state in which a second correction coordinate system is set for a second work point and a third correction coordinate system is set for a third work point.
Figure 12:
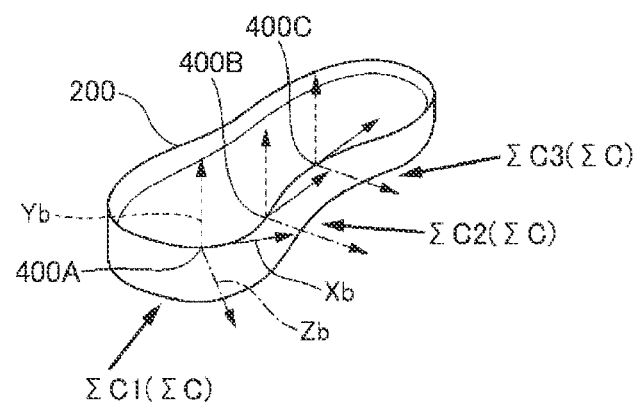

FIG. 1 shows an overall configuration of a robot system of a first embodiment. FIG. 2 is a block diagram of the robot system shown in FIG. 1. FIG. 3 is a conceptual diagram when a model of a robot is displayed using simulation software. FIG. 4 is a conceptual diagram when a model of a working object is displayed using the simulation software. FIG. 5 is a conceptual diagram when the model of the working object and the model of the robot are collectively displayed using the simulation software, showing an undesirable posture of the robot. FIG. 6 is a conceptual diagram when the model of the working object and the model of the robot are collectively displayed using the simulation software, showing a desirable posture of the robot. FIG. 7 is a conceptual diagram when the model of the working object is displayed using the simulation software, showing a state in which a working route is set. FIG. 8 is a conceptual diagram when the model of the working object is displayed using the simulation software, showing a state in which target positions are set. FIG. 9 is a conceptual diagram when the model of the working object is displayed using the simulation software, showing a state in which a first work point is set. FIG. 10 is a conceptual diagram when the model of the working object is displayed using the simulation software, showing an example of candidates of a first coordinate system. FIG. 11 is a conceptual diagram when the model of the working object and the model of the robot are collectively displayed using the simulation software, showing a state in which a first correction coordinate system is set for the first work point. FIG. 12 is a conceptual diagram when the model of the working object and the model of the robot are collectively displayed using the simulation software, showing a state in which a second correction coordinate system is set for a second work point and a third correction coordinate system is set for a third work point. FIG. 13 is a flowchart for explanation of an example of control operation of the robot system shown in FIG. 1.

As below, a teaching method according to the present disclosure will be explained in detail according to preferred embodiments shown in the accompanying drawings. Note that, hereinafter, for convenience of explanation, a +Z-axis direction, i.e., an upside in FIG. 1 is also referred to as "upper" and a −Z-axis direction, i.e., a downside is also referred to as "lower". Further, regarding a robot arm, a base 11 side in FIG. 1 is also referred to as "proximal end" and an opposite side, i.e., an end effector 20 side is also referred to as "distal end". Furthermore, the Z-axis directions, i.e., upward and downward directions in FIG. 1 are referred to as "vertical directions" and X-axis directions and Y-axis directions, i.e., leftward and rightward directions are referred to as "horizontal directions".

As shown in FIGS. 1 and 2, a robot system 100 includes a robot 1, a control apparatus 3 that controls the robot 1, and a teaching apparatus 4 and executes the teaching method according to the present disclosure.

First, the robot 1 is explained.

The robot 1 shown in FIG. 1 is a single-arm six-axis vertical articulated robot in the embodiment, and has the base 11 and the robot arm 10. Further, the end effector 20 may be attached to the distal end portion of the robot arm 10. The end effector 20 may be a component element of the robot 1 or not a component element of the robot 1.

Note that the robot 1 is not limited to the illustrated configuration, but may be e.g. a dual-arm articulated robot. Or, the robot 1 may be a horizontal articulated robot.

The base 11 is a supporter that drivably supports the robot arm 10 from the downside and fixed to e.g. a floor within a factory or the like. In the robot 1, the base 11 is electrically coupled to the control apparatus 3 via a relay cable 18. Note that the coupling between the robot 1 and the control apparatus 3 is not limited to the wired coupling like the configuration shown in FIG. 1, but may be e.g. wireless coupling or coupling via a network such as the Internet.

In the embodiment, the robot arm 10 has a first arm 12, a second arm 13, a third arm 14, a fourth arm 15, a fifth arm 16, and a sixth arm 17, and these arms are sequentially coupled from the base 11 side. Note that the number of the arms of the robot arm 10 is not limited to six, but may be e.g. one, two, three, four, five, seven, or more. The sizes including entire lengths of the respective arms are respectively not particularly limited, but can be appropriately set.

The base 11 and the first arm 12 are coupled via a joint 171. Further, the first arm 12 is pivotable about a first pivot axis parallel to the vertical direction as a pivot center relative to the base 11. The first pivot axis is aligned with a normal of the floor to which the base 11 is fixed.

The first arm 12 and the second arm 13 are coupled via a joint 172. Further, the second arm 13 is pivotable about a second pivot axis parallel to the horizontal direction as a pivot center relative to the first arm 12. The second pivot axis is parallel to an axis orthogonal to the first pivot axis.

The second arm 13 and the third arm 14 are coupled via a joint 173. Further, the third arm 14 is pivotable about a third pivot axis parallel to the horizontal direction as a pivot center relative to the second arm 13. The third pivot axis is parallel to the second pivot axis.

The third arm 14 and the fourth arm 15 are coupled via a joint 174. Further, the fourth arm 15 is pivotable about a fourth pivot axis parallel to the center axis direction of the third arm 14 as a pivot center relative to the third arm 14. The fourth pivot axis is orthogonal to the third pivot axis.

The fourth arm 15 and the fifth arm 16 are coupled via a joint 175. Further, the fifth arm 16 is pivotable about a fifth pivot axis as a pivot center relative to the fourth arm 15. The fifth pivot axis is orthogonal to the fourth pivot axis.

The fifth arm 16 and the sixth arm 17 are coupled via a joint 176. Further, the sixth arm 17 is pivotable about a sixth pivot axis as a pivot center relative to the fifth arm 16. The sixth pivot axis is orthogonal to the fifth pivot axis.

Furthermore, the sixth arm 17 is a robot distal end portion located at the most distal end side of the robot arm 10. The sixth arm 17 may pivot together with the end effector 20 by driving of the robot arm 10.

The robot 1 includes a motor M1, a motor M2, a motor M3, a motor M4, a motor M5, and a motor M6 as drivers and an encoder E1, an encoder E2, an encoder E3, an encoder E4, an encoder E5, and an encoder E6. The motor M1 is provided inside of the joint 171 and relatively rotates the base 11 and the first arm 12. The motor M2 is provided inside of the joint 172 and relatively rotates the first arm 12 and the second arm 13. The motor M3 is provided inside of the joint 173 and relatively rotates the second arm 13 and the third arm 14. The motor M4 is provided inside of the joint 174 and relatively rotates the third arm 14 and the fourth arm 15. The motor M5 is provided inside of the joint 175 and relatively rotates the fourth arm 15 and the fifth arm 16. The motor M6 is provided inside of the joint 176 and relatively rotates the fifth arm 16 and the sixth arm 17.

Further, the encoder E1 is provided inside of the joint 171 and detects the position of the motor M1. The encoder E2 is provided inside of the joint 172 and detects the position of the motor M2. The encoder E3 is provided inside of the joint 173 and detects the position of the motor M3. The encoder E4 is provided inside of the joint 174 and detects the position of the motor M4. The encoder E5 is provided inside of the joint 175 and detects the position of the motor M5. The encoder E6 is provided inside of the joint 176 and detects the position of the motor M6.

The encoders E1 to E6 are electrically coupled to the control apparatus 3 and position information, i.e., amounts of rotation of the motor M1 to motor M6 are transmitted to the control apparatus 3 as electrical signals. Then, the control apparatus 3 drives the motor M1 to motor M6 via motor driver D1 to motor driver D6 based on the information. That is, controlling the robot arm 10 refers to controlling the motor M1 to motor M6.

Further, in the robot 1, a force detection unit 19 that detects a force is detachably placed in the robot arm 10. The robot arm 10 may be driven with the force detection unit 19 placed therein. The force detection unit 19 is a six-axis force sensor in the embodiment. The force detection unit 19 detects magnitude of forces on three detection axes orthogonal to one another and magnitude of torque about the three detection axes. That is, the unit detects force components in the respective axial directions of the X-axis, the Y-axis, the Z-axis orthogonal to one another, a force component in a W direction about the X-axis, a force component in a V direction about the Y-axis, and a force component in a U direction about the Z-axis. These X-axis, Y-axis, and Z-axis are three axes defining a base coordinate system, which will be described later.

Note that, in the embodiment, the Z-axis direction is the vertical direction. The force components in the respective axial directions may be referred to as "translational force components" and the components about the respective axes may be referred to as "torque components". The force detection unit 19 is not particularly limited to the six-axis force sensor, but may have another configuration.

In the embodiment, the force detection unit 19 is placed in the sixth arm 17. Note that the placement position of the force detection unit 19 is not particularly limited to the sixth arm 17, i.e., the arm located at the most distal end side, but may be in the other arm or between the adjacent arms, for example.

The end effector 20 may be detachably attached to the force detection unit 19. The end effector 20 includes a dispenser that supplies e.g. a processing liquid such as an adhesive agent to a workpiece 200 as a working object. Further, a tool center point TCP is set at the center of the distal end of the end effector 20.

In the embodiment, the end effector 20 is not limited to the above described configuration, but may be e.g. a polisher, a grinder, a cutter, or the like, a tool such as a driver or a wrench, or a hand that grips the workpiece 200 by suction or nipping.

Further, as shown in FIG. 3, a base coordinate system ΣA and a distal end coordinate system ΣB are set for the robot 1. The base coordinate system ΣA is a coordinate system defined by the X-axis, the Y-axis, and the Z-axis with the origin in an arbitrary position of the base 11. The distal end coordinate system ΣB is a second coordinate system and defined by an Xa-axis, a Ya-axis, and a Za-axis with the origin at the tool center point TCP. These base coordinate system ΣA and distal end coordinate system ΣB are associated with each other, and thereby, the position of the tool center point TCP as the origin of the distal end coordinate system ΣB is known using the base coordinate system ΣA and actuation of the robot arm 10 may be controlled.

Next, the control apparatus 3 and the teaching apparatus 4 will be explained. In the embodiment, as an example, a case where the teaching apparatus 4 executes the teaching method according to the present disclosure will be explained, however, the present disclosure is not limited to that. For example, the teaching method may be performed by the control apparatus 3 or may be shared by the control apparatus 3 and the teaching apparatus 4.

As shown in FIGS. 1 and 2, the control apparatus 3 is placed in a position apart from the robot 1 in the embodiment. Note that the apparatus is not limited to the configuration, but may be provided inside of the base 11. The control apparatus 3 has a function of controlling driving of the robot 1 and is electrically coupled to the above described respective parts of the robot 1. The control apparatus 3 has a processor 31, a memory unit 32, and a communication unit 33. These respective units are communicably coupled to one another via e.g. a bus.

The processor 31 includes e.g. a CPU (Central Processing Unit) and reads and executes various programs etc. stored in the memory unit 32. A command signal generated in the processor 31 is transmitted to the robot 1 via the communication unit 33. Thereby, the robot arm 10 may execute predetermined work.

The memory unit 32 stores various programs etc. that can be executed by the processor 31. The memory unit 32 includes e.g. a volatile memory such as a RAM (Random Access Memory), a nonvolatile memory such as a ROM (Read Only Memory), and a detachable external memory device.

The communication unit 33 transmits and receives signals between the respective parts of the robot 1 and the teaching apparatus 4 and itself using e.g. an external interface such as a wired LAN (Local Area Network) or a wireless LAN.

Next, the teaching apparatus 4 is explained.

As shown in FIGS. 1 and 2, the teaching apparatus 4 has a function of creating and inputting a movement program for the robot arm 10. The teaching apparatus 4 has a processor 41, a memory unit 42, and a communication unit 43. The teaching apparatus 4 is not particularly limited to, but includes e.g. a tablet, a personal computer, a smartphone, and a teaching pendant.

The processor 41 includes e.g. a CPU (Central Processing Unit) and reads and executes various programs such as a teaching program stored in the memory unit 42. Note that the teaching program may be generated in the teaching apparatus 4, stored from e.g. an external recording medium such as a CD-ROM, or stored via a network or the like.

A signal generated in the processor 41 is transmitted to the control apparatus 3 of the robot 1 via the communication unit 43. Thereby, the robot arm 10 may execute predetermined work in a predetermined condition.

Further, the processor 41 reads three-dimensional data and data of the model of the robot 1 and executes the teaching method, which will be described later. This will be described in detail.

The memory unit 42 stores various programs etc. that can be executed by the processor 41. The memory unit 42 includes e.g. a volatile memory such as a RAM (Random Access Memory), a nonvolatile memory such as a ROM (Read Only Memory), and a detachable external memory device.

The communication unit 43 transmits and receives signals between the control apparatus 3 and itself using e.g. an external interface such as a wired LAN (Local Area Network) or a wireless LAN.

As above, the robot system 100 is explained.

In the robot system 100, a position and a posture of the robot arm 10 may be taught, a movement program may be created, and the robot arm 10 may be actuated to perform predetermined work. Specifically, the teaching refers to storing the position and the posture of the robot arm 10 in the memory unit 32 of the control apparatus 3 or the memory unit 42 of the teaching apparatus 4. The teaching method according to the present disclosure is a method of teaching using three-dimensional data of the workpiece 200 as the working object. Note that the three-dimensional data is not particularly limited to, but includes e.g. CAD data, illustrator data, and Photoshop data ("Photoshop" is a registered trademark).

As shown in FIG. 4, a three-dimensional data coordinate system is set for the three-dimensional data. Note that FIG. 4 is the conceptual diagram of the three-dimensional data. That is, FIG. 4 is the conceptual diagram when the three-dimensional data is read and displayed using simulation software installed in the teaching apparatus 4 or the control apparatus 3. The three-dimensional data coordinate system is a coordinate system defined by three axes of Xb, Yb, and Zb and, hereinafter, referred to as "data coordinate system ΣC".

As shown in FIG. 4, the data coordinate system ΣC is set for the workpiece 200 on the three-dimensional data in the respective positions. Note that, in FIG. 4, the data coordinate system ΣC of only five points is displayed. When the three-dimensional data and the data of the model of the robot 1 are simply read using simulation software, the data coordinate system ΣC and the above described base coordinate system ΣA and distal end coordinate system ΣB are not associated with each other. Accordingly, a phenomenon as shown in FIG. 5 occurs.

FIG. 5 is the conceptual diagram when the three-dimensional data is read using the above described simulation software the model of the workpiece 200 and the model of the robot 1 are collectively displayed. The base coordinate system ΣA and the distal end coordinate system ΣB set for the robot 1 are not associated and, when the posture of the robot arm 10 is deformed so that the directions of Xa of the distal end coordinate system ΣB and Xb of the data coordinate system ΣC, Ya of the distal end coordinate system ΣB and Yb of the data coordinate system ΣC, and Za of the distal end coordinate system ΣB and Zb of the data coordinate system ΣC may be simply aligned, the robot arm 10 takes the undesirable posture as shown in FIG. 5. Note that the undesirable posture refers to, for example, after the tool center point TCP is moved in one direction from the posture, a peculiar posture or a posture having a smaller movable range. The teaching in this condition is not good teaching.

Accordingly, in the present disclosure, the data coordinate system is corrected and good teaching can be performed by the following method. That is, for example, as shown in FIG. 6, teaching to form the desirable posture may be performed. As below, the teaching method according to the present disclosure will be explained according to the flowchart shown in FIG. 13. Further, as below, the explanation will be started from a state in which the three-dimensional data of the workpiece 200 and three-dimensional data of a virtual robot corresponding to the robot 1 are read using the simulation software. The read information may be displayed on a monitor of the teaching apparatus 4 and the following various selection and determination operations may be performed using an input device such as a mouse or a keyboard of the teaching apparatus 4.

Hereinafter, the model of the robot 1 within the simulation software is also referred to as "virtual robot 1A".

1. Step S101

First, in the desired posture of the robot arm 10 of the virtual robot 1A, the tool center point TCP is moved close to the workpiece 200. The desired posture refers to e.g. a posture close to a posture when work is performed as shown in FIG. 6.

2. Step S102

Then, at step S102, as shown in FIG. 7, a working route 300 is selected. The working route 300 refers to a trajectory through which the tool center point TCP passes when work is performed. In the embodiment, the working route 300 is an edge portion of the upper surface of the workpiece 200, i.e., a ridge line of the workpiece 200 as seen from above.

3. Step S103

Then, at step S103, as shown in FIG. 8, target positions 400 are selected and coordinates are specified. The target position 400 refers to a movement target of the tool center point TCP when the work is performed. In the embodiment, the target positions 400 are set in a plurality of locations on the working route at predetermined intervals. Then, at this step, the coordinates of the respective target positions 400 are specified. In the embodiment, the coordinates in the robot coordinate system are specified.

4. Step S104

Then, at step S104, as shown in FIG. 9, a first work point 400A as a work start point is specified. In the embodiment, when the robot arm 10 is moved close to the workpiece 200 at step S101, the target position 400 closest to the tool center point TCP is set as the first work point 400A. This step S104 is a first step of setting the predetermined first work point 400A on the working route 300 based on the three-dimensional data.

As described above, the first work point 400A is set according to a position relationship between the workpiece 200 as the working object and the robot 1 when the robot arm 10 performs work. Thereby, after teaching, the robot 1 may smoothly start the work.

5. Step S105

Step S105 is a second step of associating the data coordinate system ΣC as the first coordinate system set for the first work point 400A with the distal end coordinate system ΣB as the second coordinate system set for the robot arm 10 when the tool center point TCP as a control point is located. Note that "associating the data coordinate system ΣC with the distal end coordinate system ΣB" refers to correcting the direction of the data coordinate system ΣC so that the direction of Xb of the data coordinate system ΣC may be closer to or preferably aligned with the direction of Xa of the distal end coordinate system ΣB, the direction of Yb of the data coordinate system ΣC may be closer to or preferably aligned with the direction of Ya of the distal end coordinate system ΣB, and the direction of Zb of the data coordinate system ΣC may be closer to or preferably aligned with the direction of Za of the distal end coordinate system ΣB, respectively.

At this step, a rotation matrix R1 that rotates the base coordinate system ΣA to the distal end coordinate system EB and a rotation matrix R2 that rotates the base coordinate system ΣA to the data coordinate system ΣC are used.

The rotation matrix R1 may be expressed by the following expression (1).

$$R1 = \begin{bmatrix} C\beta1C\gamma1 & S\alpha1S\beta1C\gamma1 - C\alpha1S\gamma1 & C\alpha1S\beta1C\gamma1 + S\alpha1S\gamma1 \\ C\beta1S\gamma1 & S\alpha1S\beta1S\gamma1 + C\alpha1C\gamma1 & C\alpha1S\beta1S\gamma1 - S\alpha1C\gamma1 \\ -S\beta1 & S\alpha1C\beta1 & C\alpha1C\beta1 \end{bmatrix} \quad (1)$$

γ1 in the expression (1) is a rotation angle roll about the Z-axis and refers to a rotation angle about the Z-axis from a reference position in the base coordinate system ΣA. β1 is a rotation angle pitch about the Y-axis and refers to a rotation angle about the Y-axis from a reference position in the base coordinate system ΣA. α1 is a rotation angle yaw about the X-axis and refers to a rotation angle about the X-axis from a reference position in the base coordinate system ΣA. Further, in the expression (1), trigonometric functions Sin(θ) and Cos(θ) are abbreviated to Sθ and Cθ, respectively.

Further, the rotation matrix R2 may be expressed by the following expression (2).

$$R2 = \begin{bmatrix} C\beta2C\gamma2 & S\alpha2S\beta2C\gamma2 - C\alpha2S\gamma2 & C\alpha2S\beta2C\gamma2 + S\alpha2S\gamma2 \\ C\beta2S\gamma2 & S\alpha2S\beta2S\gamma2 + C\alpha2C\gamma2 & C\alpha2S\beta2S\gamma2 - S\alpha2C\gamma2 \\ -S\beta2 & S\alpha2C\beta2 & C\alpha2C\beta2 \end{bmatrix} \quad (2)$$

γ2 in the expression (2) is a rotation angle roll about the Z-axis and refers to a rotation angle about the Z-axis from a reference position in the base coordinate system ΣA. β2 is a rotation angle pitch about the Y-axis and refers to a rotation angle about the Y-axis from a reference position in the base coordinate system ΣA. α2 is a rotation angle yaw about the X-axis and refers to a rotation angle about the X-axis from a reference position in the base coordinate system ΣA. Further, also, in the expression (2), trigonometric functions Sin(θ) and Cos(θ) are abbreviated to Sθ and Cθ, respectively.

Then, in the rotation matrix R2, rotation matrix R2A to rotation matrix R2J as shown in FIG. 10 are obtained. Note that the rotation matrix R2A to rotation matrix R2J shown in FIG. 10 are examples and there is another pattern than the illustrated pattern.

The rotation matrix R2A is an initial rotation matrix when a roll angle is $\gamma2$, a pitch angle is $\beta2$, and a yaw angle is $\alpha2$ acquired from the three-dimensional data. The rotation matrix R2B is a rotation matrix obtained by rotation of $\gamma2$ by +90° relative to R2A. The rotation matrix R2C is a rotation matrix obtained by rotation of $\gamma2$ by +180° relative to R2A. The rotation matrix R2D is a rotation matrix obtained by rotation of $\gamma2$ by +270° relative to R2A. The rotation matrix R2E is a rotation matrix obtained by rotation of $\beta2$ by +90° relative to R2A. The rotation matrix R2F is a rotation matrix obtained by rotation of $\beta2$ by +180° relative to R2A. The rotation matrix R2G is a rotation matrix obtained by rotation of $\beta2$ by +270° relative to R2A. The rotation matrix R2H is a rotation matrix obtained by rotation of $\alpha2$ by +90° relative to R2A. The rotation matrix R2I is a rotation matrix obtained by rotation of $\alpha2$ by +180° relative to R2A. The rotation matrix R2J is a rotation matrix obtained by rotation of $\alpha2$ by +270° relative to R2A.

In addition, 24 rotation matrices of all combinations of patterns of addition of 0°, 90°, 180°, 270° to $\gamma2$, $\beta2$, $\alpha2$ including e.g. rotation matrices by rotation of $\gamma2+90°$, $\beta2+90°$, $\alpha2+90°$ are obtained. Hereinafter, the 24 rotation matrices are collectively referred to as "rotation matrices R2'". Obtaining the rotation matrices R2' refers to calculating a plurality of candidates of the data coordinate system $\Sigma C$ at the first work point 400A.

Note that the patterns of angles substituted in $\gamma2$, $\beta2$, $\alpha2$ are not limited to those described above.

Then, these candidates of the data coordinate system $\Sigma C$ are compared to the distal end coordinate system $\Sigma B$ and proper one is selected from the candidates of the data coordinate system $\Sigma C$. Specifically, sums of inner products $x1 \cdot x2 + y1 \cdot y2 + z1 \cdot z2$ of unit vectors x1, y1, z1 representing XYZ directions of the rotation matrix R1 and unit vectors x2, y2, z2 representing XYZ directions of the rotation matrix R2 are calculated and one rotation matrix R2 having the value of the sum closest to 3.0 is selected. The value of the sum of the inner products of the rotation matrix R1 and the rotation matrix R2 is a degree of deviation of the candidate of the data coordinate system $\Sigma C$ from the distal end coordinate system $\Sigma B$.

Then, the selected coordinate system is set for the first work point 400A as the first correction coordinate system. That is, for example, the coordinate system of the rotation matrix having the lowest deviation is selected from the total 24 rotation matrices R2' including the rotation matrices R2A to R2J as shown in FIG. 10 and the other candidates and, as shown in FIG. 11, the coordinate system is set for the first work point 400A and stored as a first correction coordinate system $\Sigma C1$. Thereby, when the tool center point TCP is located at the first work point 400A, the posture of the robot arm 10 may be set to a proper posture. That is, even in teaching using the three-dimensional data, good teaching may be performed.

Note that, in the above description, the configuration of selecting one of the candidates of the data coordinate system $\Sigma C$ having the lowest deviation from the distal end coordinate system $\Sigma B$ is explained, however, the present disclosure is not limited to that. For example, the second closest one may be selected.

Or, a threshold value may be set for the value of the sum of the inner products of the rotation matrix R1 and the rotation matrix R2. For example, when the value of the sum of the inner products of the rotation matrix R1 and the rotation matrix R2 is larger than the threshold value, a predetermined condition may be regarded as being satisfied.

As described above, at the second step, the coordinate system having the deviation from the distal end coordinate system $\Sigma B$ as the second coordinate system when the tool center point TCP as the control point is located at the first work point 400A satisfying the predetermined condition is selected from the candidates of the data coordinate system $\Sigma C$ as the plurality of first coordinate systems. Thereby, the distal end coordinate system and the data coordinate system may be associated with each other more accurately. Therefore, good teaching may be performed.

Further, at the second step, it is preferable that, when there are a plurality of coordinate systems having the deviations satisfying the predetermined condition, that is, having the sums of the inner products larger than the threshold value, the coordinate system having the smallest deviation is set as the first correction coordinate system. Thereby, the better teaching may be performed.

Note that, in the above description, the configuration using the value of the sum of the inner products of the rotation matrix R1 and the rotation matrix R2 as the deviation is explained, however, the present disclosure is not limited to that. For example, a sum of outer products of the rotation matrix R1 and the rotation matrix R2 may be used.

6. Step S106

Then, at step S106, the movement direction of the tool center point TCP when the work is performed is set in the working route 300. The setting may be performed by e.g. operation and selection by the operator using the input device of the teaching apparatus 4 or automatic selection of a side in a direction pointed by a predetermined axis of the first correction coordinate system $\Sigma C1$.

7. Step S107

Then, at step S107, a second work point 400B located anteriorly to the first work point 400A in the movement direction designated at step S106 is specified, the data coordinate system $\Sigma C$ at the second work point 400B is corrected, and a second correction coordinate system $\Sigma C2$ is set. The step S107 is a third step of aligning the data coordinate system $\Sigma C$ with the distal end coordinate system $\Sigma B$ when the tool center point TCP is located at the second work point 400B located anteriorly to the first work point 400A in the movement direction of the tool center point TCP in the working route 300.

At this step, the candidates of the rotation matrix of the first correction coordinate system $\Sigma C1$ are calculated and these are compared to the rotation matrix R1 of the distal end coordinate system $\Sigma B$. Then, the coordinate system of the rotation matrix having the smallest deviation of the candidates is set as the second coordinate system. Specifically, though not illustrated, for rotation matrix of the first correction coordinate system $\Sigma C1$, 24 combinations of substitution of 0°, 90°, 180°, 270° to $\gamma$, $\beta$, $\alpha$ are obtained in the same manner as that at step S106. Then, sums of inner products of these 24 rotation matrices and the rotation matrix R1 are calculated and the coordinate system having the sum closest to three is set for the second work point 400B as the second correction coordinate system $\Sigma C2$. That is, as shown in FIG. 12, the data coordinate system $\Sigma C$ at the second work point 400B is set for the second work point 400B and stored as the second correction coordinate system $\Sigma C2$. Thereby, when the tool center point TCP is located at the second work point 400B, the posture of the robot arm 10 may be set to a proper posture. That is, even in teaching using the three-dimensional data, good teaching may be performed.

Further, the correction coordinate system at the present time is obtained using the correction coordinate system at the previous work point, and thus, when the tool center point TCP moves, for example, from the first work point 400A to the second work point 400B, the change in posture of the robot arm 10 may be made smaller. Therefore, the better teaching may be performed.

Then, in the same manner as that described above, regarding a third work point 400C, a third correction coordinate system $\Sigma C3$ is obtained based on the second correction coordinate system $\Sigma C2$ and set. In the same manner, though not illustrated, correction coordinate systems are obtained for all of the work points on the working route 300 and, when the setting is completed, step S107 is ended.

As described above, the working route 300 includes the second work point 400B through which the tool center point TCP as the control point passes after the first work point 400A. Further, the teaching method according to the present disclosure includes the third step of aligning the first coordinate system set for the second work point 400B with the second coordinate system when the tool center point TCP is located at the second work point 400B. Thereby, also, at the second work point 400B, the posture of the robot arm 10 during work may be set to a desired posture.

At the third step, the second correction coordinate system $\Sigma C2$ is set based on the first correction coordinate system $\Sigma C1$ set at the second step. Thereby, when the tool center point TCP is moved from the first work point 400A to the second work point 400B, the change in posture of the robot arm 10 may be made smaller. Therefore, the better teaching may be performed.

As described above, the teaching method according to the present disclosure is the teaching method of teaching the position of the tool center point TCP on the working route 300 through which the tool center point TCP as the control point set on the robot arm 10 passes when the robot arm 10 performs the work and the posture of the robot arm 10 using the three-dimensional data of the working object. Further, the method includes the first step of setting the predetermined first work point 400A on the working route 300 based on the three-dimensional data and the second step of associating the data coordinate system $\Sigma C$ as the first coordinate system set for the first work point 400A with the distal end coordinate system $\Sigma B$ as the second coordinate system set for the robot arm 10 when the tool center point TCP is located at the first work point 400A. Then, at the second step, one is selected from the plurality of candidates of the data coordinate system $\Sigma C$ at the first work point 400A, and the selected coordinate system is set as the first correction coordinate system $\Sigma C1$ for the first work point 400A.

Thereby, during the work, when the tool center point TCP is located at the first work point 400A, the posture of the robot arm 10 may be set to a proper posture. Particularly, the coordinate system as the first correction coordinate system $\Sigma C1$ is selected from the plurality of candidates of the data coordinate system $\Sigma C$, and thereby, the posture of the robot arm 10 may be taught as a more desirable posture. As a result, even in teaching using the three-dimensional data, good teaching may be performed.

As above, the teaching method according to the present disclosure is explained with respect to the illustrated preferred embodiments, however, the present disclosure is not limited to those. The respective steps of the teaching method may be replaced by arbitrary steps that may exert the same functions. Or, an arbitrary step may be added thereto.

What is claimed is:

1. A teaching method for causing a processor to execute a process, the teaching method comprising the steps of:
   executing simulation software to read 3D data in an object coordinate system with respect to a work object;
   displaying a virtual robot corresponding to a robot and a virtual work object corresponding to the work object on a display during the execution of the simulation software, the robot having a robot arm with a tool, the virtual robot having a virtual robot arm with a virtual tool corresponding to the robot arm with the tool, the robot having a robot coordinate system, the robot arm with the tool having a tool coordinate system, the robot coordinate system, the object coordinate system, and the tool coordinate system being without associating each other;
   moving the virtual robot arm with the virtual tool toward the virtual work object;
   selecting a working route through which a control point on the virtual robot arm passes based on the 3D data in the object coordinate system when the robot arm performs work for the work object in a real world;
   setting a plurality of target points on the selected working route;
   obtaining coordinates of the plurality of target points in the robot coordinate system;
   identifying a first work point among the plurality of target points from which the virtual robot arm with the virtual tool starts the work;
   generating a first rotation matrix rotating the robot coordinate system to the tool coordinate system and a second rotation matrix rotating the robot coordinate system to the object coordinate system;
   calculating candidate coordinate systems in the object coordinate system for the first work point based on the first and second rotation matrixes and the obtained coordinates of the plurality of target points;
   selecting one coordinate system for the first work point from the candidate coordinate systems by comparing the candidate coordinate systems with the tool coordinate system;
   setting the selected one coordinate system as a first correction coordinate system;
   creating an operation program for the work through the working route based on the first correction coordinate system; and
   operating the robot based on the created operation program.

2. The teaching method according to claim 1, wherein the selected one coordinate system has a state in which a deviation from the tool coordinate system satisfies a predetermined condition.

3. The teaching method according to claim 2, wherein when the processor selects a plurality of coordinate systems for the first work point from the candidate coordinate systems based on the predetermined condition, the processor is configured to determine a value of the deviation of each of the plurality of coordinate systems, and
   the processor sets, as the first correction coordinate system, the one coordinate system that has a smallest value of the deviation among the plurality of coordinate systems.

4. The teaching method according to claim 3, further comprising:
identifying a second work point among the plurality of target points through which the virtual robot arm with the virtual tool passes after the first work point;
calculating candidate coordinate systems in the object coordinate system for the second work point based on the first and second rotation matrixes and the obtained coordinates of the plurality of target points; and
selecting another coordinate system for the second work point from the candidate coordinate systems by comparing the candidate coordinate systems with the tool coordinate system.

5. The teaching method according to claim 4, further comprising:
setting the selected another coordinate system as a second correction coordinate system based on the first correction coordinate system; and
creating the operation program for the work through the working route based on the first correction coordinate system and the second correction coordinate system.

6. The teaching method according to claim 1, wherein
the first work point is set based on a position relationship between the work object and the robot when the robot arm performs the work.

* * * * *